Jan. 5, 1943.   F. C. KULIEKE   2,307,321
DRAFT GEAR
Filed Nov. 3, 1941   3 Sheets-Sheet 1

INVENTOR.
Frederick C. Kulieke
BY
ATTY.

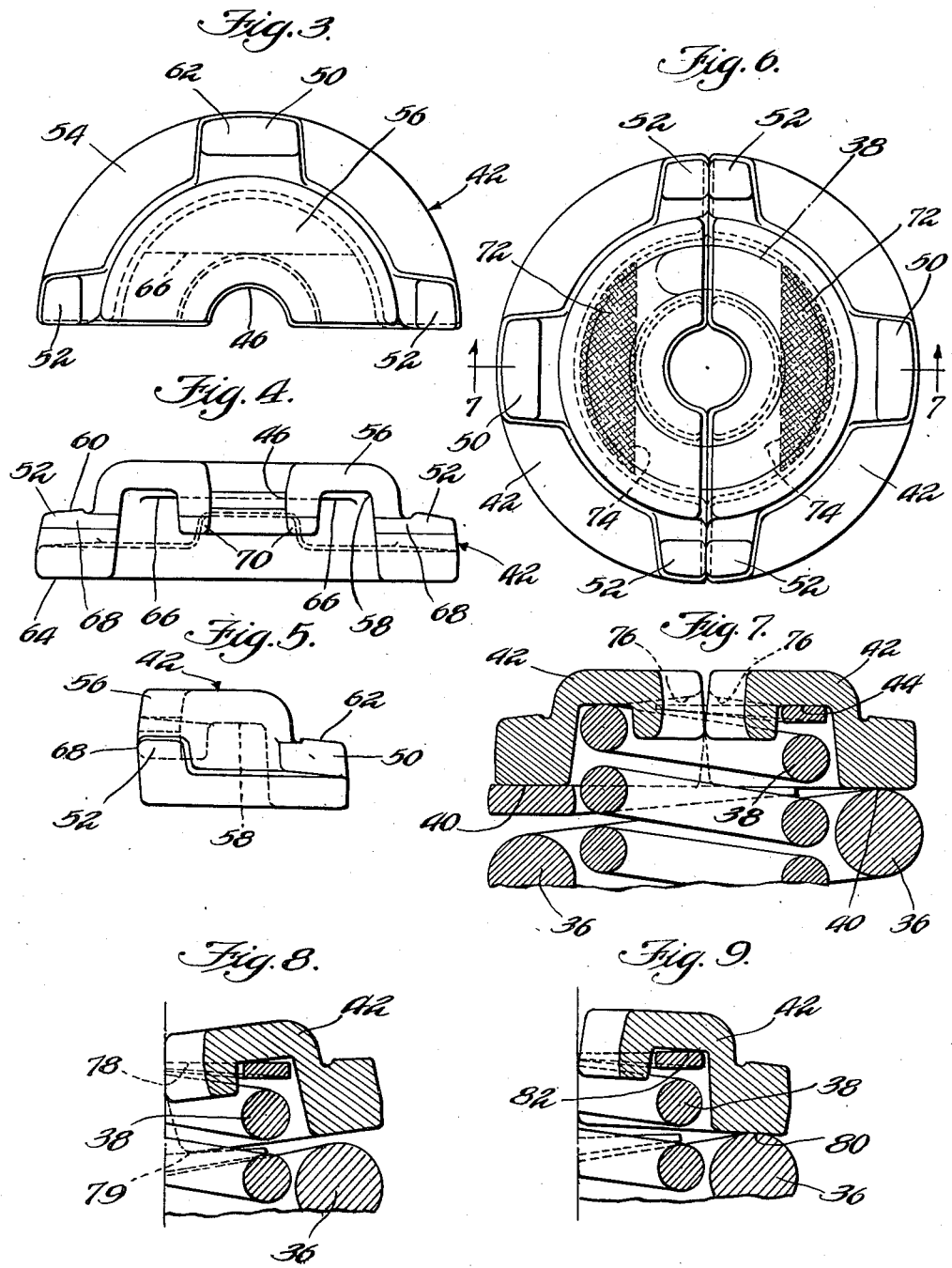

Jan. 5, 1943.  F. C. KULIEKE  2,307,321
DRAFT GEAR
Filed Nov. 3, 1941   3 Sheets-Sheet 3
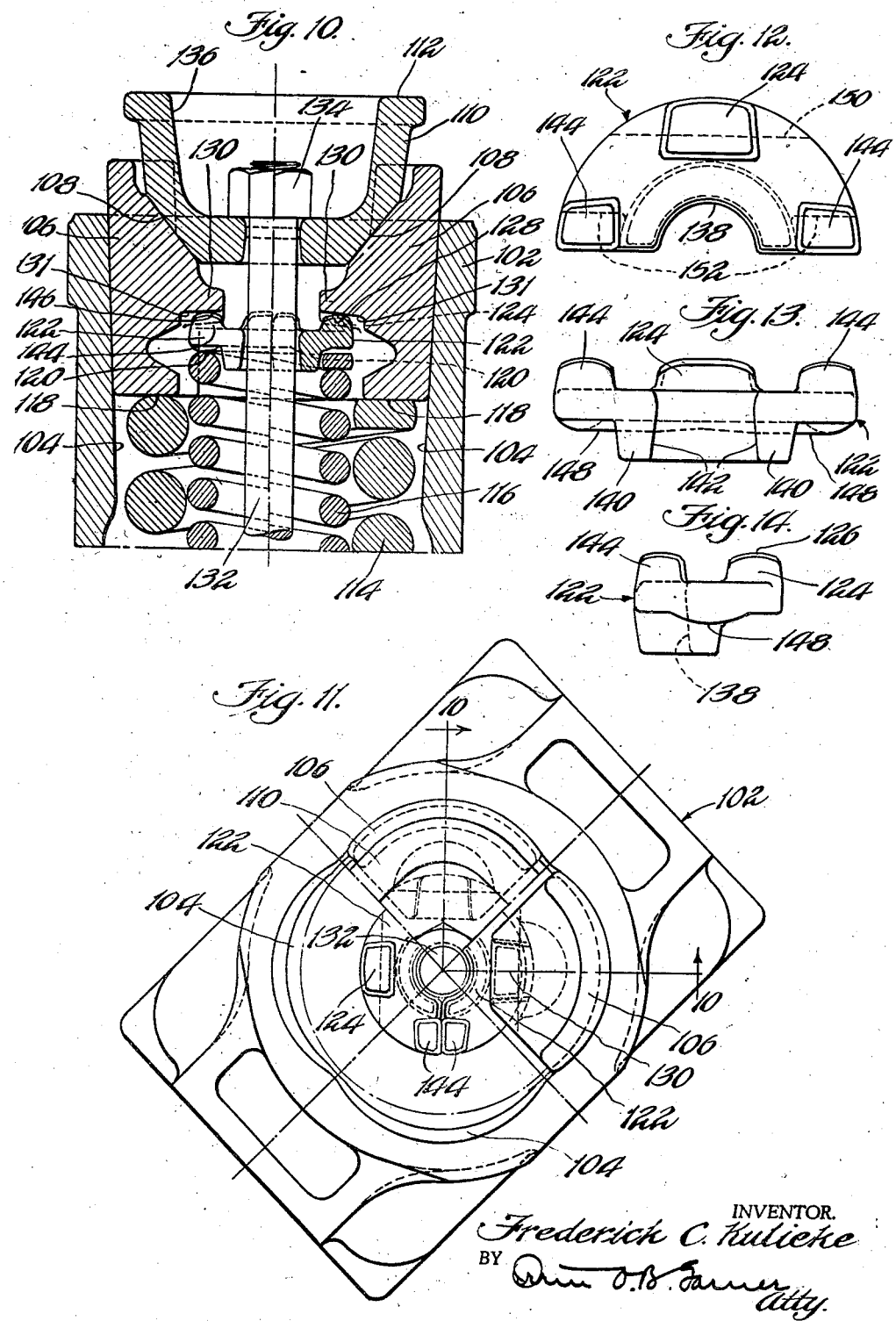
INVENTOR.
Frederick C. Kulieke
BY
Atty.

Patented Jan. 5, 1943

2,307,321

UNITED STATES PATENT OFFICE 2,307,321

DRAFT GEAR

Frederick C. Kulieke, Alliance, Ohio, assignor to American Steel Foundries, Chicago, Ill., a corporation of New Jersey Application November 3, 1941, Serial No. 417,641

21 Claims. (Cl. 213—32)

My invention relates to a friction device sometimes designated draft gear and particularly a type of gear commonly called clutch type utilizing a housing with an open end, with friction surfaces therearound against which may be seated friction shoes forming a portion of the clutch mechanism housed therein.

The general object of my invention is to afford a means for maintaining tight shoes in a clutch type gear when said shoes are in released position in such a gear utilizing a plurality of shoes, wedging means, and a compression spring within a housing.

A different object is to afford a novel somewhat flexible means of transmitting the forces of impact from the shoes to the compression spring.

My invention comprehends an arrangement for equalizing the thrust of the compression spring against the several friction shoes of the clutch mechanism.

My invention contemplates such an equalizing arrangement as that just mentioned wherein a minimum number of parts may function to perform the shoe tightening action, said parts being so designed and arranged as to accomplish this function in relatively simple and effectual manner.

A different object of my invention is to devise a novel form of equalizer particularly suitable for use in a draft mechanism of the type illustrated and utilizing two pairs of shoes symmetrically arranged within a friction housing.

In the drawings, Figure 1 is a fragmentary longitudinal sectional view through a draft gear embodying my invention, the section being taken in two planes substantially at right angles to each other and as indicated by the line 1—1 of Figure 2.

Figure 2 is an end view of the draft gear shown in Figure 1, the view being taken from the open end of the housing, and certain parts being removed in the respective quarter portions of the view in order more clearly to illustrate the arrangement of the parts.

Figures 3, 4, and 5 show my novel form of equalizer member, two of which may be used in said gear, Figure 3 being a plan view thereof taken from the outer face as applied in the gear, Figure 4 a view from the bottom as seen in Figure 3, and Figure 5 a view from the right as seen in Figure 4.

Figure 6 is a somewhat diagrammatic plan view of equalizer means taken from the top thereof.

Figure 7 is a sectional view through the equalizer means taken substantially in the transverse plane indicated by the line 7—7 of Figure 6.

Figure 8 is a fragmentary sectional view corresponding to the right half of Figure 7 but illustrating a different operating condition.

Figure 9 is a view comparable to that of Figure 8 but illustrating an operating condition in which the equalizer is tilted in the reverse direction.

Figures 10 and 11 illustrate another modification of draft gear utilizing my invention, Figure 10 being a longitudinal sectional view taken in two planes substantially at right angles to each other and as indicated by the line 10—10 of Figure 11, and Figure 11 being an end view thereof with certain parts removed in the respective quarter portions in order more clearly to illustrate the parts.

Figure 1:
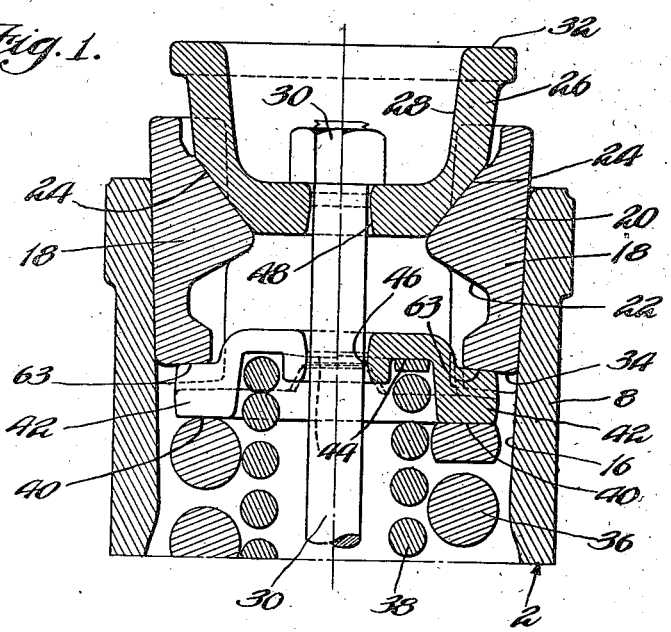

Figures 12, 13, and 14 show the detail of my novel form of equalizer utilized in the embodiment illustrated in Figures 10 and 11, Figure 12 being a top plan view thereof, Figure 13 a side or edge view taken from the bottom as seen in Figure 12, and Figure 14 an end view taken from the right as seen in Figure 12.

Describing the structure in detail, my draft gear housing generally designated 2 is of well known form comprising the base 4, the lateral edges of which may be aligned with flat portions 6, 6 at opposite sides of the barrel or housing generally designated 8, so that said base and said flat portions may form convenient faces affording seats for said gear in normal position. The opposite parallel edges of the housing 10, 10 may be aligned with the outer edges of longitudinal flanges 12, 12 extending for the length of the housing and joined at their outer extremities by webs 14, 14, so that the edges 10, 10 of the base portion together with the flanges 12, 12 may form other seats for the gear when placed in a position at right angles to that first-mentioned.

The open end of the housing 8 may be formed with symmetrically arranged friction surfaces 16, 16, said friction surfaces tapering toward the open end of the housing and being arranged in two pairs along axes substantially at right angles to each other. The open end of the housing thus presents a scallop-like appearance with the friction surfaces 16, 16 symmetrically arranged therearound. Against each friction surface 16 may be seated a friction shoe 18, each of said shoes having an arcuate back wall with a friction face substantially complementary in form to the adjacent friction surface on the housing and each shoe may be formed with a relatively heavy central shelf-like portion 20 below which may be formed a relief or cavity 22 to reduce the weight of said shoe. On the upper diagonally arranged flat surface of the shelf portion 20, each shoe may have frictional engagement as at 24 with the complementarily arranged flat face on the follower 26, said follower having a usual cup-like form with the cavity 28 on the outer face thereof affording means for housing the threaded end of the securing bolt 30. The outer annular surface of the follower 26 may define a seat 32 for one end of the gear.

Housed within the casing 8 in the usual manner with their inner ends seated against the base 4, may be the outer main compression spring 36 and the inner auxiliary compression spring 38, the outer end of said main spring being seated as at 40, 40 against the equalizer members 42, 42, each of said equalizer members having the form hereinafter described in detail. The auxiliary spring 38 may normally seat against each equalizer member 42 at an intermediate point as at 44, 44, and each equalizer member may be slotted centrally thereof as at 46 (Figure 3) to afford clearance for the securing bolt 30, said securing bolt also extending through the central opening 48 in the follower 26 in usual manner. It may be noted that the auxiliary spring seats 44, 44 against the equalizer members 42, 42 are spaced a substantial distance from the seats 40, 40 against which the main spring 36 may abut thus facilitating the equalizing action of said equalizer members as hereafter more fully described.

The shoes 18, 18 as already indicated are symmetrically arranged within the barrel and may be considered as two pairs or sets of shoes arranged along axes substantially at right angles to each other.

Each equalizer 42 is generally semi-circular in plan (Figure 3) and on the outer face and adjacent the perimeter thereof may be formed a bearer 50, said bearer being somewhat tapered in form and conveniently fitting within the before-mentioned central slot 34 on the bottom of the adjacent shoe. At each end of the equalizer 42 and on the outer face thereof may be formed end bearers 52, 52, two of said end bearers being designed to seat within a single slot 34 on the bottom of one of the shoes so that in the assembled gear one set of shoes will seat against and be interlocked with the central or intermediate bearers 50, 50 on said equalizers, while the other set of shoes will rest upon and have interlocking engagement with the bearers 52, 52, two of which will be received in each slot 34.

My novel form of equalizer is shown in detail in Figures 3, 4, and 5. Its general plan, as already indicated, is that of a half-circular plate whose outer perimeter may be defined by the annular flange 54, said flange being substantially offset downwardly or inwardly as positioned in the gear with respect to the annular central portion generally designated 56, the walls whereof may define an annular channel or slot 58 within which may conveniently be received the before-mentioned auxiliary compression spring 38. Each of the end bearers 52 may be formed with a flat slightly tapered or diagonally arranged top surface 60 and the central or intermediate bearer 50 may likewise have a tapered top surface 62 and the bottom of each shoe may have within the slot 34 a flat surface with the complementary taper against which said bearers may seat as at 63, 63 (Figure 1). The inner face of the flange 54 affords an annular seat as at 64 for the main compression spring 36 and a seat 66 in a parallel plane is afforded for the auxiliary spring 38 within the channel 58 already referred to. The straight edge of each equalizer member may be chamfered somewhat above and below the middle portion thereof as best seen in the end view of Figure 5 so that the respective equalizer members may normally abut each other intermediate their top and bottom surfaces along said straight edges and adjacent the extremities thereof as at 68, 68 and at intermediate areas as at 70, 70 (Figure 4). By this arrangement the equalizer members may rock or fulcrum against each other.

As already indicated, the auxiliary spring seat 66 within the channel 58 of each equalizer member is in a plane parallel to the main spring seat 64 but spaced therefrom. The seat 66 is confined to the area 72 within the channel 58 indicated by the shaded portion as illustrated in Figure 6. Each seat 66 may have a substantially straight marginal edge 74 and from said marginal edge the base wall of each channel 58 may taper away toward the open ends thereof in manner best illustrated at 76, 76 in the sectional view of Figure 7. It will thus be seen that under certain operating conditions each equalizer member 42 may have a tilting action on the springs, such tilting action being illustrated in Figure 8 wherein it may be seen that the equalizer 42 has been tilted and the auxiliary spring 38 may seat as at 78 along the before-mentioned surface 76, while fulcruming as at 79 on the main spring 36. A reversed tilting action is illustrated in Figure 9 in which the equalizer 42 fulcrums as at 80 on the main spring 36 and the auxiliary spring 38 bears against the equalizer 42 as at 82. It will be understood that Figures 8 and 9 illustrate extreme positions and it is not contemplated that the equalizer members will tilt to this extent in their shoe tightening function. The amount of tilting of course depends upon the manufacturing tolerances which may be permitted thus causing the bottom surfaces of the shoes which seat upon the equalizers to lie in spaced planes instead of a single plane due to said tolerances. It will be understood also that either equalizer may assume any intermediate position between that illustrated in Figure 8 and that shown in Figure 9.

To those skilled in the art, it will be apparent that due to manufacturing tolerances of parts certain of the shoes tend to be loose after assembly. The inner compression or auxiliary spring will be effective to tilt the equalizer members in such manner as to permit the tightening of said shoes. It will be understood that if the pair of shoes engaging the end bearers of the equalizers tend to be loose the equalizers will tilt toward the position illustrated in Figure 9 wherein the extremities of the equalizer members are left free of the outer or main compression spring while the intermediate portion of each equalizer beneath the central bearer will seat upon the main compression spring 36 as shown in Figure 9. On the other hand, if the pair of shoes seating against the center bearers of the equalizers tend to be loose, tendency toward the condition illustrated in Figure 8 prevails wherein each equalizer fulcrums as at 79 on the main spring 36 and bears as at 78 on the auxiliary spring thus effectively tightening the shoes. It should be noted that the pressure of the inner or auxiliary compression spring 38 is applied to each equalizer member 42 along an area 72 extending longitudinally of the equalizer and lying approximately midway between the center shoe bearer and the two end shoe bearers. This area 72 thus acts as a fulcrum center for tilting of the equalizer member. This tilt action will enable the shoes to adjust themselves for such manufacturing tolerances as may be desirable and will result in a tightening which will permit all the shoes to function effectively in the development of friction. This arrangement permits all of the shoes to be brought into tight frictional engagement with the housing and therefore as the gear is compressed due to the sudden blows normally received in service, the housing will elastically change shape permitting all four shoes to bear with substantially equal force against the main compression spring as the clutch is closed under the force of the blow. The pressure of the shoe against the housing gradually increases and the shape of the open end of the housing is changed to some extent in an effort to equalize the pressure of the friction shoes against the housing. The energy expending in deforming the housing in the elastic manner under the forces of the blow of compression is potential and is returned to the gear just prior to release, as the distorted part of the housing returns to normal shape thus moving the shoes slightly radially inwardly and helping to break the frictional contact between the various parts of the clutch mechanism.

Figure 2:
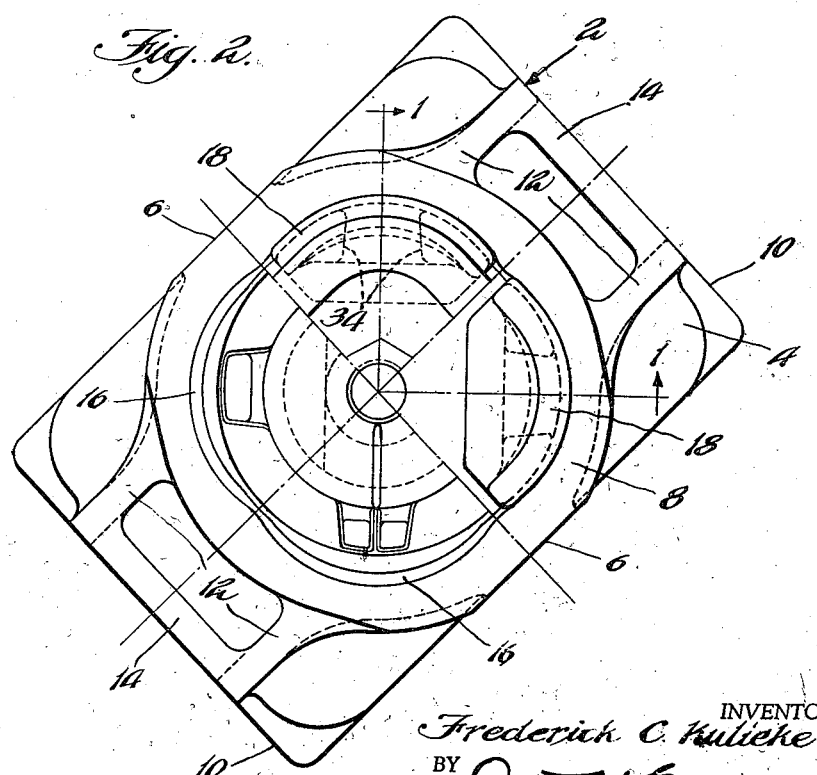

In the modification illustrated in Figures 10 and 11, I have utilized a somewhat different form of equalizer to accomplish a result similar to that just described for the modification illustrated in Figures 1 and 2. As illustrated in Figures 10 and 11, my novel draft gear comprises the barrel or housing 102, only the open end or friction end being illustrated, said housing 102 being substantially identical to that described for the previous modification. Adjacent said open end and symmetrically arranged therearound may be pairs of tapering friction surfaces 104, 104 against which may seat in usual manner pairs of opposed friction shoes 106, 106. Each friction shoe 106 may have diagonal flat face engagement as at 108 with the complementary surface formed on the inwardly directed face of the cup-shaped follower 110 whose outer annular face 112 may afford a seat for one end of the gear. Within the housing 102 may be the main compression spring 114 and the auxiliary compression spring 116, said main compression spring seating as at 118, 118 against the bottoms of the respective friction shoes 106, 106 and said auxiliary spring having bearing as at 120, 120 against intermediate portions of the respective equalizer members 122, 122. As in the previous modification, each equalizer member 122 may have on its outer face a central bearer 124 crowned as at 126 and seating as at 128 against the somewhat inclined bottom surface of the shelf portion 130 of the adjacent shoe 106. The bottom face of each shelf portion 130 may be slotted as at 131 in order to afford interlocking engagement with the equalizer intermediate bearer or end bearers as the case may be. The parts of the clutch mechanism may be held in their normal relationship within the gear by the usual securing bolt 132, the inner end of which may be fixed in usual manner in the bottom wall of the housing and the outer end of which may be secured by the threaded nut 134, said outer end being conveniently housed in the recess 136 formed on the outer face of the follower 110.

My novel form of equalizer is shown in detail in Figures 12, 13, and 14. It will be understood that two such equalizer members 122 identical in form will be utilized in each gear, each equalizer appearing in plan as a half round or half circular plate as best seen in the top plan view of Figure 12, each of said equalizers having along its straight edge a semi-circular slot 138 defined by the annular flange 140 depending from the bottom face of said equalizer, said slot 138 affording clearance for the securing bolt 132 when the parts are in assembled relationship. The walls of the slot 138 may be tapered as best seen at 142, 142 in the view of Figure 13, thus accommodating the tilting action of the equalizer already described. On the top face of each equalizer member 122 may be the central bearer 124 and at each extremity thereof an end bearer 144, each of said bearers being crowned in two directions as may readily be seen from a comparison of the views of Figures 13 and 14. Each bearer also is somewhat tapered in form from bottom to top and formed with arcuate radii about all edges thereof. The crowned surface of each bearer affords a convenient rocking engagement against the shelf portion 130 of the associated friction shoe. This engagement is illustrated at 146 in Figure 10. On the bottom of each equalizer and longitudinally thereof is formed a central crowned or raised portion generally designated 148, said raised portion extending for the length of the equalizer member and one edge thereof being defined by the tangential margin indicated at 150 (Figure 12) while the opposite parallel edge thereof is indicated at 152, 152 in the same figure. The crowned portion 148 affords a seat for the auxiliary spring 116 at 120 (Figure 10) as already described. It will thus be seen that each equalizer member 122 will be afforded a fulcrum engagement with the auxiliary compression spring 116 along intermediate areas between the end bearers 144, 144 and the middle bearer 124 thus permitting the rocking action already described.

It will thus be seen that in both modifications of my novel form of gear I have provided compression spring means, two pairs of friction shoes, and two equalizer members interposed between the spring means and the shoes in such manner that a tilting action thereof may be permitted in order to allow the shoes of both sets to seat tightly against the housing irrespective of normal manufacturing tolerances. In each case a form of equalizer is used which permits a fulcruming action thereof by the manner of engagement of the equalizer member with said compression spring means at one side thereof and two pairs of friction shoes on the opposite side thereof, the structure being such that in each case end bearers on the equalizers engage one set of shoes while intermediate bearers on the respective equalizers engage respective shoes of the other set.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a draft gear, a barrel type housing having an open end with pairs of tapering friction faces therearound, pairs of friction shoes seated against said faces with the shoes of respective pairs along axes substantially at right angles to each other, a wedge follower, inner and outer concentric compression springs, and equalizing means interposed between said shoes and said springs, said equalizing means comprising two members at respective sides of said gear, each of said members affording seats for said springs in spaced planes, and each of said members having diagonal face engagement with one shoe of one set and with both shoes of the other set intermediate said planes.

2. In a draft gear, a barrel type housing having an open end with two pairs of tapering friction faces symmetrically arranged therearound, pairs of friction shoes seated against said faces with the shoes of respective pairs along axes substantially at right angles to each other, a wedge follower, inner and outer concentric compression springs, and equalizing means interposed between said shoes and said springs, said equalizing means comprising two members at respective sides of said gear, each of said members affording seats for said springs in spaced planes, and each of said equalizer members having interlocking engagement with one shoe of one set and with both shoes of the other set intermediate said planes.

3. In a draft gear, a housing having a friction end with tapering friction faces therearound, two pairs of friction shoes seated against said faces respectively, a wedge follower engaging said shoes, concentric compression springs, and equalizer means interposed between said shoes and said springs, said equalizer means comprising identical equalizer members at opposite sides of the gear, each of said equalizer members affording concentric seats for said springs in spaced planes, and each of said equalizer members having abutment with three of said shoes in a plane intermediate said first-mentioned planes.

4. In a draft gear, a housing having an open end with friction faces therearound, two pairs of friction shoes seated against said surfaces, a wedge follower, inner and outer concentrically arranged compression springs, and equalizer means interposed between said shoes and said springs, said equalizer means comprising two semi-circular elements, each of said elements affording concentric seats for said springs respectively in spaced planes, and each of said elements having interlocking engagement with three of said shoes intermediate said planes.

5. In a draft gear, a barrel type housing having an open end with two pairs of tapering friction faces, two pairs of friction shoes seated against said faces, a wedge follower, inner and outer concentric compression springs, and equalizing means interposed between said shoes and said springs, said equalizing means comprising two members at respective sides of said gear, each of said members affording seats for said springs in spaced planes, and each of said equalizer members having diagonal face engagement with three of said shoes intermediate said planes.

6. In an equalizer for a draft gear, a member of generally semi-circular form having about its outer periphery an annular flange in the plane of said member with spaced elevated pads on the outer face thereof, said member having on its inner face an annular slot forming a seat and affording positioning means for an associated coil spring, and an annular face defining a spring seat in a plane spaced from said first-mentioned seat.

7. In a draft gear, a housing having an open end with tapering friction faces, two pairs of friction shoes seated against said faces along axes substantially at right angles to each other, a wedge follower, inner and outer concentrically arranged compression springs, and equalizer means interposed between said shoes and said springs, said equalizer means comprising identical members at opposite sides of said gear, each of said members affording seats for said springs in spaced planes and having abutment with three of said shoes intermediate said planes.

8. In a draft gear, a housing having an open end with tapering friction faces symmetrically arranged therearound, two pairs of friction shoes seated against said surfaces along axes substantially at right angles to each other, a wedge follower, inner and outer compression springs, and equalizer means interposed between said shoes and one of said springs, said equalizer means comprising two elements each having diagonal face engagement with both shoes of one pair and with one shoe of the other pair, and the other of said springs bearing directly against said shoes.

9. In a draft gear, a housing having an open end with friction faces therearound, two pairs of friction shoes seated against said faces, a wedge follower, main and auxiliary compression springs, and equalizer means interposed between said shoes and said springs, said means comprising identical members at opposite sides of the gear each bearing against three of said shoes, each of said members affording seats for said springs in spaced parallel planes, and abutting means on said members permitting rocking action thereof with respect to at least one of said springs.

10. In a draft gear of clutch type, a housing having an open end with friction faces, two pairs of friction shoes seated against said faces, a wedge follower engaging said shoes, main and auxiliary compression springs, and equalizer means interposed between said springs and said shoes, said means comprising similar members each bearing against three of said shoes, said members affording a spring seat for said main spring adjacent their outer perimeters, and said auxiliary spring being operative to tilt said members under certain operative conditions.

11. In a draft gear, a housing having tapering friction faces arranged in two pairs along axes substantially at right angles to each other, friction shoes seated against said faces respectively, a wedge follower engaging said shoes, main and auxiliary compression springs, and equalizers interposed between said auxiliary spring and said shoes, each of said equalizers having diagonal face engagement with three of said shoes, and said main spring having abutment against certain of said shoes.

12. In an equalizer for a draft gear, a semi-circular member presenting on its inner face a flat annular surface affording a seat for an associated spring and an annular channel defining a spring seat in a plane spaced from said first-mentioned seat, and a plurality of bearers spaced about the perimeter of said member on the outer face thereof intermediate said planes for abutment with associated friction shoes.

13. In a draft gear, a housing having an open end with friction faces therearound, two pairs of friction shoes seated against said faces, a wedge follower, main and auxiliary compression springs, and equalizer means interposed between one of said springs and said shoes, the other of said springs bearing directly against said shoes, said equalizer means comprising identical members at opposite sides of said gear each in interlocking engagement with both shoes of one set and with one shoe of the other set.

14. In a draft gear, a housing having tapering friction faces arranged in pairs along axes substantially at right angles to each other, friction shoes seated against said faces respectively, a wedge follower engaging said shoes, main and auxiliary compression springs, said main spring bearing directly against said shoes, and equalizers interposed between said auxiliary spring and said shoes, each of said equalizers having diagonal face engagement with at least one shoe of each set and bearing against three of said shoes.

15. In a draft gear, a housing having pairs of diametrically opposed friction faces, friction shoes seated thereagainst, a wedge follower engaging said shoes, a main compression spring abutting the inner ends of said shoes, an auxiliary compression spring, and two co-planar equalizers at opposite sides of said gear each interlocked with said shoes of both pairs and bearing against three of said shoes, said auxiliary compression spring affording a fulcrum for each of said equalizers.

16. In an equalizer for a draft gear, a semicircular member having in spaced planes on one face thereof concentrically arranged annular spring seats, one of said seats being adjacent the outer perimeter and the other adjacent the inner perimeter, and a plurality of shoe bearing areas on the opposite face thereof spaced about the outer perimeter of said member intermediate said planes.

17. In an equalizer for a draft gear, a semicircular member having on one face a plurality of annular surfaces affording in spaced planes seats for associated concentric springs and having on its opposite face a plurality of spaced bearing areas intermediate said planes for abutment with associated friction shoes.

18. In a draft gear, a housing having two pairs of diametrically opposed friction faces, friction shoes seated thereagainst, a wedge follower engaging said shoes, a main compression spring abutting the inner ends of said shoes, an auxiliary compression spring, and two co-planar equalizers interposed between said auxiliary spring and intermediate shelves on said shoes.

19. In a draft gear, a housing having two pairs of diametrically opposed friction faces, friction shoes seated thereagainst, a wedge follower engaging said shoes, a main compression spring abutting the inner ends of said shoes, an auxiliary compression spring, and two co-planar equalizers interposed between said auxiliary spring and intermediate shelves on said shoes, each of said equalizers bearing against three of said shoes.

20. In a draft gear, a housing having two pairs of diametrically opposed friction faces, friction shoes seated thereagainst, a wedge follower abutting said shoes, main and auxiliary compression springs, and two co-planar equalizers interposed between said springs and said shoes, each equalizer bearing against three of said shoes, said main and auxiliary springs seating against said equalizers in spaced planes at opposite sides of the shoe abutting areas on said equalizers.

21. In a draft gear, a housing having two pairs of diametrically opposed friction faces, friction shoes seated thereagainst, a wedge follower abutting said shoes, main and auxiliary compression springs, and two co-planar equalizers interposed between said springs and said shoes, each equalizer bearing against three of said shoes and each of said equalizers being capable of a tilting action while bearing against both of said springs.

FREDERICK C. KULIEKE.